G. LITTLEFORD.
FEEDING MECHANISM.
APPLICATION FILED SEPT. 18, 1916.

1,229,987.

Patented June 12, 1917.

Inventor
George Littleford
By C. W. Miles
Attorney

Witnesses
B. R. Kropf
W. Thornton Bogert

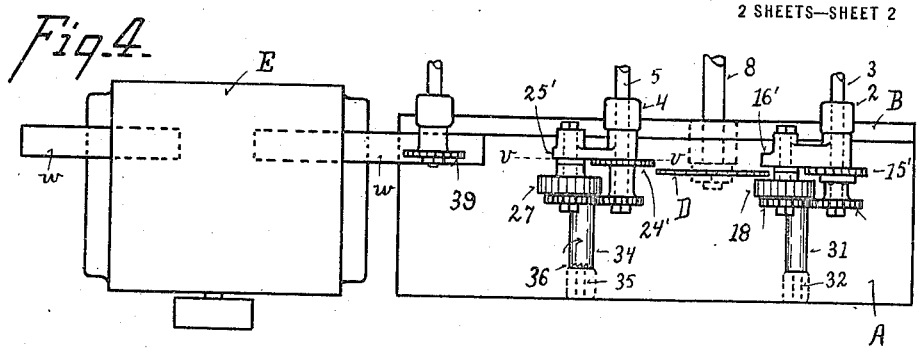
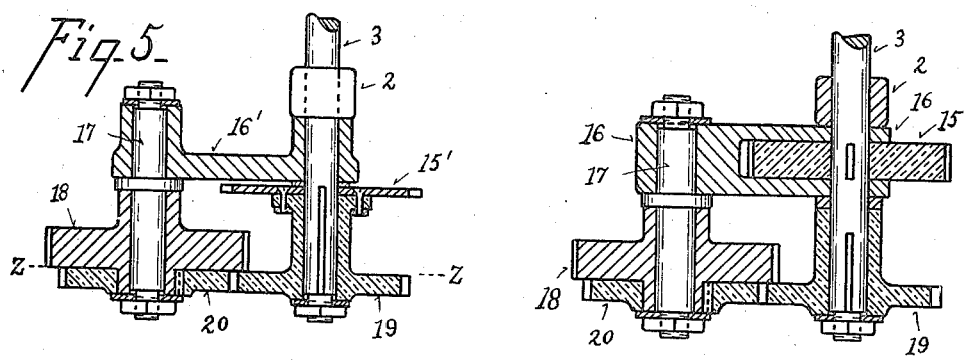
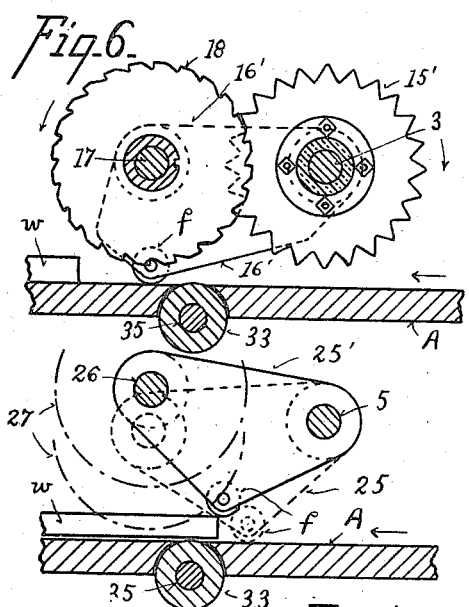
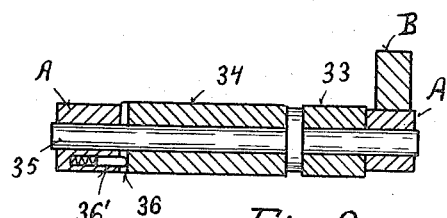

UNITED STATES PATENT OFFICE.

GEORGE LITTLEFORD, OF FORT THOMAS, KENTUCKY.

FEEDING MECHANISM.

1,229,987.  Specification of Letters Patent.  Patented June 12, 1917.

Application filed September 18, 1916. Serial No. 120,879.

*To all whom it may concern:*

Be it known that I, GEORGE LITTLEFORD, a citizen of the United States, residing at Fort Thomas, in the county of Campbell and State of Kentucky, have invented certain new and useful Improvements in Feeding Mechanism, of which the following is a specification.

My invention relates to improvements in feeding mechanism for rip saws and other wood working and similar machines. One of its objects is to provide a feeding mechanism to feed one portion of the stock forward through and away from the saw or other tool and to automatically return another portion of the stock to the operator at the front of the saw or tool. Another object is to provide improved mechanism whereby the one portion of the stock may be fed uninterruptedly and successively through a plurality of machines without intermediate operators, and another portion of the stock automatically returned to the operator at the forward end of the first tool. Another object is to provide improved automatically operated return feed mechanism for a portion of the stock. Another object is to provide improved means to check or overcome the inertia of the stock to be returned, resulting from the forward feed thereof and to start it on its return. My invention also comprises certain details of form, combination and arrangement, all of which will be fully set forth in the description of the accompanying drawings, in which:

Fig. 3 is a sectional detail on line $x$ $x$ of Fig. 1.

Fig. 4 is a top plan view of a rip saw and planer, illustrating a modification of the feeding mechanism.

Fig. 5 is a sectional view similar to Fig. 3, of the modification illustrated in Fig. 4.

Fig. 6 is a section on line $z$ $z$ of Fig. 5.

Fig. 7 is a sectional detail on line $v$ $v$ of Fig. 4.

Fig. 8 is a sectional detail of one of the stock supporting rollers.

Figure 1:
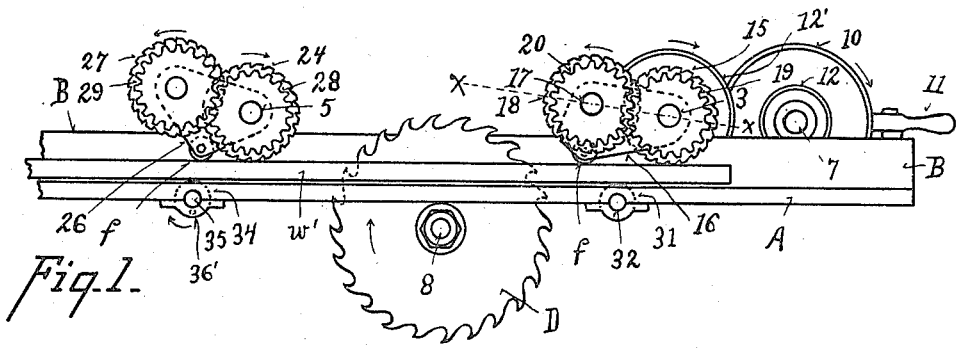
Figure 1 is a side elevation of a rip saw illustrating one form of my improved feeding mechanism applied thereto.

The accompanying drawings represent the preferred embodiments of my invention in which A represents a saw table, B an adjustable fence or guide for the stock, D a saw, and E a planer. Mounted in bearings 2 rigid relative to the saw table is a forward feed shaft 3 and mounted in bearings 4 rigid relative to the saw table is a rear feed shaft 5. A belt or sprocket chain 6 drives a pulley 10 on a counter shaft 7 at slower speed than the saw from the saw mandrel 8, through a clutch 9, which is operable by means of a hand lever 11 to clutch the pulley 10 to the shaft 7 to stop or start the feed mechanism. A belt or chain on pulleys 12 and 12' drives the feed shaft 3 from shaft 7, in the same direction at a slower rate of speed, and a belt or sprocket chain 14 drives the feed shaft 5 from the feed shaft 3 at the same rate of speed, and in the same direction.

Figure 2:
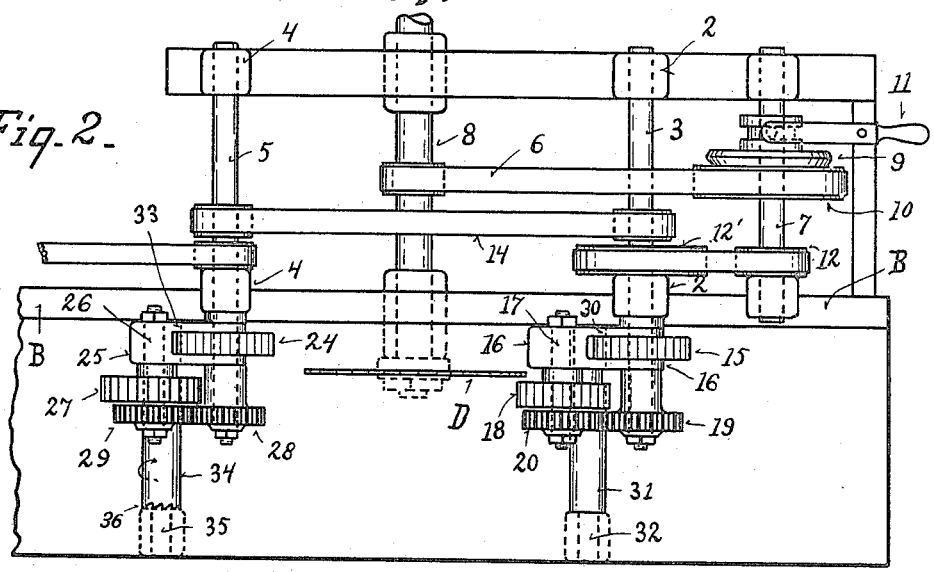
Fig. 2 is a top plan view of the same.

Mounted rigidly on the feed shaft 3, see Figs. 1 to 3 is a feed roller 15 having a milled or fluted surface to engage the stock on a line between the fence and the line of the saw. Also loosely journaled on the feed shaft between the fence and the line of the saw is a cam 16 which is actuated by gravity to hold the face of the cam normally in contact with the upper face of the saw table. As the stock is fed by the operator by hand under the feed roller 15 the stock also engages and lifts the cam 16 which rides on the upper face of the stock, and after the stock has passed it the cam drops back into contact with the face of the table.

A stud shaft 17 is carried rigidly by the cam 16 and a feed roller 18 similar to roller 15 is loosely journaled on the stud shaft 17. A gear 19 rigid on feed shaft 3 meshes with a gear 20 keyed to the hub of feed roller 18. The feed roller 18 is on the opposite side of the saw line from the feed roller 15, and is driven by gears 19 and 20 in the reverse direction to that of feed roller 15. While stock is being fed forward by the roller 15 the cam 16 is lifted above the saw table carrying feed roll 18 with it out of contact with the stock. As soon as the stock leaves roll 15 and cam 16 the cam 16 and roll 18 are lowered to bring roll 18 into position to engage the upper face of the stock.

The feed shaft 5 is provided with a forward feed roll 24 similar to roll 15, and a cam 25 similar to cam 16, but with a cam face preferably somewhat different from the cam face of cam 16, see Figs. 6 and 7. The cam 25 carries a stud shaft 26 similar to stud shaft 17 and a return feed roll 27 similar to return feed roll 18 is loosely journaled on the stud shaft 26 and is driven from shaft 5 in reverse direction by gears 28 and 29, similar to gears 19 and 20. I preferably employ loosely journaled rollers 30 and 31 on a spindle 32 carried by the table under the forward feed mechanism, the rollers 30 and 31 being independently free to rotate in either direction. Similar rollers 33 and 34 on a spindle 35 are mounted under the rear feed mechanism, the roller 33 being free to rotate in either direction while the roller 34 is preferably provided at one end with ratchet teeth 36 to be engaged by a spring actuated pawl 36' to enable said roller 34 to move freely in only one direction as indicated by the arrows in the drawings.

I preferably provide one or more anti-friction rollers $f$ journaled on axles carried at the lower apex of the cams 16 and 25, or 16' and 25' to ride upon the upper face of the stock in place of allowing the lower apex of the cams to ride directly and drag along the upper face of the stock.

The forward feed roller 24 of the rear feed mechanism is designed to engage the stock before the stock has freed itself from the forward feed roll 15, and to continue the forward feed of the stock until the stock has been entirely severed by the saw into two sections $w$ and $w'$. The section of stock $w$ after being severed continues its forward feed past the saw until it is disengaged from feed roll 24 while stock section $w'$ as soon as it is severed by the saw loses its forward momentum or energy, in which it is assisted by dragging over the roller 34 held against rotation by its pawl 36' so that stock section $w'$ comes to a position of rest upon the roll 34 before the stock section $w$ has freed itself from the roll 24. As soon as stock section $w$ is free from roll 24 and cam 25 the cam 25 and reverse feed roll 27 are lowered bringing the roller 27 into contact with the stock section $w'$ above the roller 34 and said stock section $w'$ then commences to move in reverse direction or toward the front of the saw. As soon as the stock section $w'$ on its return feed reaches the feed roller 18, this roller takes up the work of assisting and finally completing the return feed. The operator then moves the stock section $w'$ over against the fence and starts the work on another forward feed to sever another stock section $w$, until all has been converted into stock sections $w$ with possibly a narrow strip of waste stock.

As illustrated in the drawings the shafts 3 and 5 are some distance apart, and this position is suitable for stock sections of considerable length. The shafts 3 and 5 with their feed mechanism are preferably moved closer together and closer to the saw where stock sections of shorter length are to be severed. The respective feed mechanisms thus practically prevent the operator from accidental contact with the saw and form a guard therefor. Also the feed rolls and cams constitute a hold-down guard to retain the stock in the desired position upon the saw table. The two return feed rolls also serve as a hold-down guard for the section $w'$ on its return feed and prevent it on its return from shifting so as to contact with the saw.

The stock sections $w$ may be fed from the saw and used rough, but as illustrated in Fig. 4 I preferably combine the saw with one or more planers or other tools into and through which the successive stock sections $w$ are automatically fed without necessity of handling by intermediate operators, the finished product being finally received and disposed of by an operator at the end of the final tool.

In the modification Figs. 4, 5 and 6 a narrow in-feed blade or spur feed roller 15' is employed in line with or close to the line of the saw, and a cam 16' of less width than cam 16 between the forward feed roller 15' and the fence. Also the rear forward feed roller 24' is a narrow toothed or spur feed roller close to the line of the saw. The return feed rollers are substantially the same as heretofore described for Figs. 1, 2, and 3. In both modifications the cams are of substantially the same outline. The modification of feed mechanism in Fig. 4 is better adapted to cut narrow sections $w$. The cam outline may be considerably modified without materially affecting the result. Preferably the forward cam is of an outline to permit the stock to be fed readily beneath it by hand while the rear cam is of an outline to readily ride upon the front end of the stock and also reaching its maximum downward projection at a point where it will early free itself from the rear end of the stock section $w$ and lower the roller 27 into engagement with the stock section $w'$ before stock section $w'$ has an opportunity to be carried by its acquired momentum past and out of the path of roll 27. Any desired number of plain rollers similar to rollers 30, 31, 33 may be mounted on the saw table, to carry the stock forward, and if desired one or more extra forward feed rolls 39 to insure the passage of stock sections $w$ from one tool to another.

The mechanism herein illustrated and described is capable of considerable modification without departing from the principle of my invention.

Having described my invention what I claim is:

1. In combination with a tool to operate upon the stock, a support on which to feed the stock, and a stock feeding mechanism comprising a positively driven member to feed the stock forward to the tool, a member pivotally supported relative to the shaft of said positively driven member to be displaced from its normal position by the stock in its passage to the tool, a return feed member carried by and displaced with said pivotally supported member by the passage of the stock, said return feed member returning to its normal position after the passage of the stock in the forward direction and thereby engaging a portion of the stock to feed it in the opposite direction.

2. In combination with a tool to operate upon the stock, a support on which to feed the stock, a feed shaft, a forward feed member mounted upon and rotatable with the feed shaft, a member loosely journaled upon the feed shaft and in position to be engaged and moved out of its normal position by the stock, a return feed member journaled upon said loosely journaled member and movable thereby into and out of engagement with the stock, and mechanism to drive said return feed member in reverse direction from the feed shaft.

3. In combination with a plurality of tools to successively act upon the stock to be treated, means to automatically feed a first section of the stock past the successive tools, and a return feed mechanism adjacent to the first of said tools to automatically engage and feed a second section of the stock in the reverse direction to the feed of said first stock section, and comprising a supporting member carried rotatably relative to said forward feed member and in position to be engaged by the first stock section, and a return feed member rotatably mounted thereon and movable therewith through engagement with the first stock section.

4. In combination with a stock severing tool, a support on which to feed the stock, a plurality of feed shafts, forward feed members mounted on said respective feed shafts to positively feed a first section of stock to and away from said severing tool, pivotally supported members to be engaged and displaced from their normal positions by said first stock section, return feed members rotatably mounted upon said pivotally supported members in position to engage a second stock section and driven from said respective feed shafts in reverse direction, said return feed members being held out of engagement with the second stock section during the severing operation by engagement of said pivotal members with said first stock section.

5. In combination with a stock severing tool, a support on which to feed the stock, positively driven means to feed the first section of the stock to and away from said severing tool, a positively driven return feed member normally in position to engage a second section of the stock to feed it in the opposite direction, a roller carried by said stock support to support said second stock section and rotatable in only one direction, and means engaged by said first stock section to displace said return feed member out of engagement with the stock until after the stock has been severed.

6. In combination with a stock severing tool, a support on which to feed the stock, a pair of feed shafts journaled in rigidly mounted bearings, forward and return feed members employed in pairs in advance of and in rear of said tool, said forward feed members being mounted upon said respective feed shafts in position to engage a first section of stock to feed it forward, and said return feed members being rotatably mounted upon members in position to be displaced from their normal positions by engagement with said first stock section, and in position to engage a second stock section to feed it in reverse direction, and gear mechanism to drive said return feed members in reverse direction from said feed shafts.

7. In combination with a stock severing tool, a support on which to feed the stock, a plurality of feed shafts, rotary driven stock forward and return feeding members employed in pairs in advance of and in rear of said tool, said forward feed members being mounted upon said feed shafts in position to engage a first section of the stock to feed the stock forward, and said return feed members being located in position normally to engage a second section of the stock to feed it in the opposite direction to said first section, and pivotally supported members movable relative to said feed shafts, and to which said return feed members are journaled to be engaged by said first stock section to displace said return feed members out of engagement with said second stock section until after the stock sections have been severed.

8. In combination with a stock severing tool and one or more tools to successively engage and act upon a first stock section and means to automatically feed said first stock section past said several tools, a support on which to feed the stock, a positively rotary driven return feed member located at one side of and in rear of said severing tool in position to normally engage a second stock section to feed it in the oposite direction to that of said first stock section, and a member pivotally supported in the plane of travel of said first stock section to which said return feed member is journaled actuated by said first stock section to displace said return feed member out of engagement with said second stock section until after said stock sections have been severed from each other.

9. In combination with a stock severing tool, a support on which to feed the stock, having an adjustable stock gage, a positively driven forward feed member to engage and feed a first stock section between said tool and said stock gage, a positively driven return feed member located at the opposite side of said tool in position to normally engage a second stock section to feed it in the opposite direction to that of said first stock section, and a member rotatably mounted concentrically with the axis of rotation of said forward feed member, and projecting into the path of travel of said first stock section, and upon which said return feed member is rotatably mounted.

In testimony whereof I have affixed my signature in the presence of two witnesses.

GEORGE LITTLEFORD.

Witnesses:
C. W. MILES,
W. THORNTON BOGERT.